June 24, 1969 F. R. BLATTNER 3,451,749

ANIMATION DEVICE

Original Filed Jan. 9, 1964 Sheet 1 of 5

Frederick R. Blattner
INVENTOR

BY James F Weiler
Jefferson D Giller
William A Stout
Paul L DeVerter Jr
ATTORNEYS Frederick R. Blattner
INVENTOR BY James F Weiler
Jefferson D Giller
William A Stout
Paul L DeVerter II
ATTORNEYS Frederick R. Blattner
INVENTOR BY James F Weiler
Jefferson D Giller
William A Stout
Paul L DeVerter III
ATTORNEYS Frederick R. Blattner
INVENTOR
BY James F. Weiler
Jefferson D. Giller
William A. Stout
Paul L. DeVerter Jr.
ATTORNEYS Frederick R. Blattner
INVENTOR.
BY James F Weiler
Jefferson D Giller
William A Stout
Paul L DeVerter III
ATTORNEYS 3,451,749
ANIMATION DEVICE
Frederick R. Blattner, 2227 Bellefontaine, Houston, Tex. 77025
Original application Jan. 9, 1964, Ser. No. 336,827, now Patent No. 3,350,158, dated Oct. 31, 1967. Divided and this application Apr. 20, 1967, Ser. No. 665,651
Int. Cl. G03b *21/38*
U.S. Cl. 352—87 9 Claims

ABSTRACT OF THE DISCLOSURE

An animation device including a roll of tape and an image transmission system whereby a previously drawn scene on the tape is transmitted to a new section of tape so that further subsequent scenes may be traced with appropriate modifications for animation purposes. Various attachments and modifications may be added for transcribing, viewing and projecting, distorting, and supplementing the animation produced by this technique.

Figure 1:
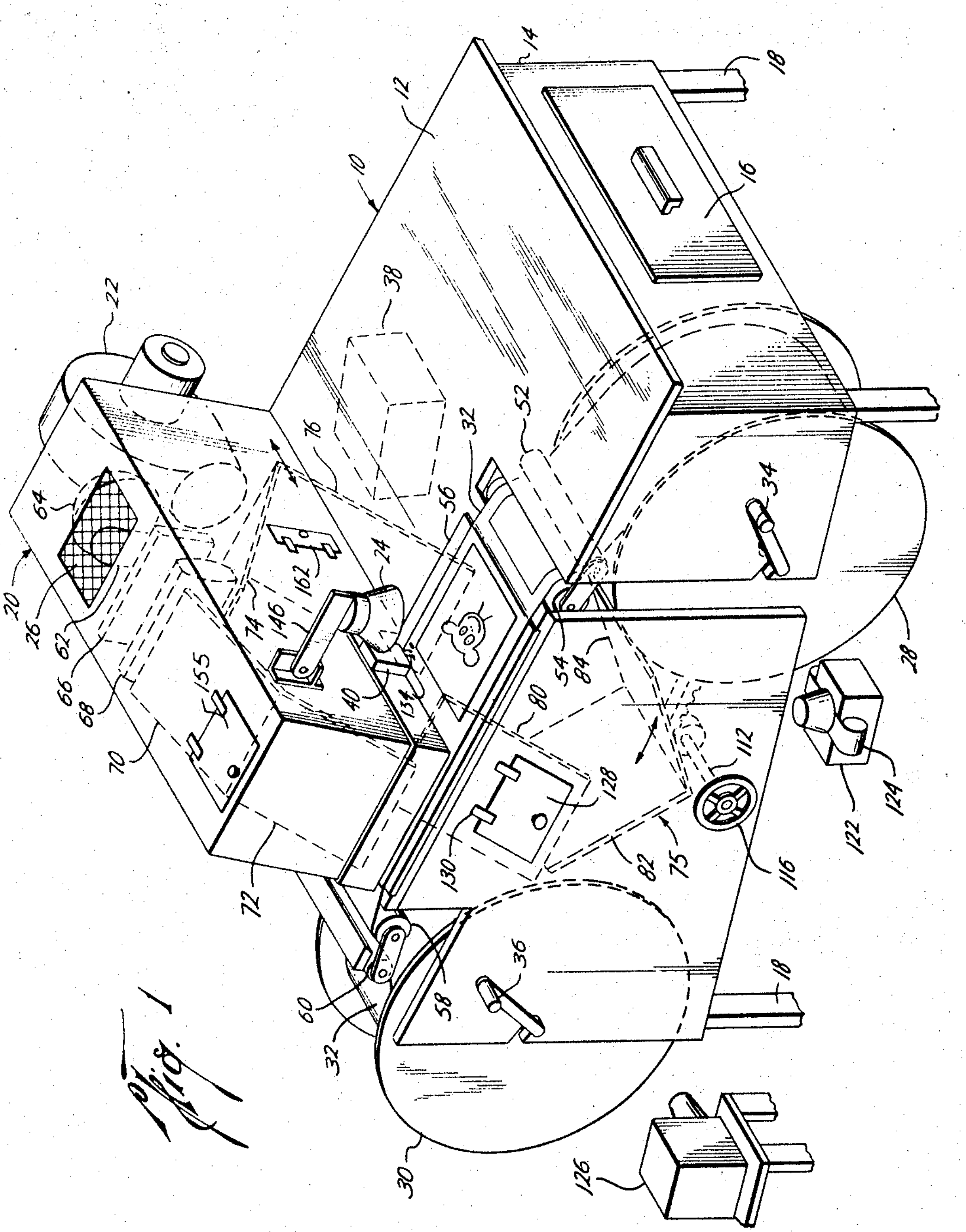

The present invention is a division of copending application Ser. No. 336,827, filed Jan. 9, 1964, entitled animation technique, now Patent No. 3,350,158 issued Oct. 31, 1967.

The present invention relates to an animation technique and, more particularly, to an apparatus for the production of animated cartoons, or the like; an apparatus for viewing and projecting the animation produced and for transcribing the same to other media, such as movie film.

For a number of years the common practice in the manufacture of animated cartoons has been the manual drawing of the various scenes on an appropriate medium, and the copying thereof, drawing by drawing, with a movie camera. Typically the technique also includes the use of celluloid or acetate overlays (called cels in the trade) on which the moving parts are appropriately drawn, while the background consists of static material. Patents illustrating this manner of making animated cartoons are Goldman, No. 1,715,127, of May 28, 1929; Mann, No. 1,760,156, of May 27, 1903; Fleischer, No. 1,242,674, of Oct. 9, 1917; and Hurd, No. 1,380,298, of May 31, 1921.

As can well be imagined, the production of innumerable cels with appropriate background scenes, and the photographing thereof, is a time-consuming and expensive process requiring the artistic and technical skills of a number of individuals.

In order to make the process of producing animation less expensive and more efficient, it is an object of the present invention to avoid handling and registering large numbers of separate drawings. It is thus an object of the present invention to place the sequence of drawings comprising the animation on a single sheet. In this connection the sheet may be of any suitable material including stiff, pliable, transparent, translucent, opaque, inexpensive, or flimsy materials which may be unsuitable for conventional animation methods. Furthermore, no perforations or any other permanent registration marks are necessary on or through the sheet. As will be seen, it is also not necessary to space the drawings uniformly on the sheet and the same sheet of drawings may be used in preparing, viewing, editing, and transcribing of animation to other media such as movie film.

Another object of the present invention is to provide animation apparatus wherein consecutive drawings may be traced from a preceding scene on the same sheet with no physical overlay of any portions of the sheet and with no delay. With it, the animator is able to create animation effects which have hithertofore been difficult or impossible to achieve, as well as conventional effects.

In this apparatus, a first scene is drawn on the sheet and the just completed scene is transmitted by an image transmission system to a subsequent portion of the sheet and a successive scene is traced thereon with appropriate modifications. In this connection "transmission of a scene" refers to the action of an image transmission system defined as follows:

An image transmission system is any system which gives the visual effect of superimposing the two regions of the sheet without physical overlay of the two regions and without delay. Appropriate modifications may be made either by mistracing the transmitted image or by accurately tracing a distorted image produced by the image transmission system containing distortion means.

As examples, an image transmission system may produce its effect: (1) by forming a real or virtual, distorted or undistorted image of one region of the sheet at another region thereon, (2) by forming superimposed virtual images of the two regions with or without distortion, and (3) by forming superimposed real images of the two regions with or without distortion on a third surface. In this connection the term "distortion" includes any deviation of the transmitted image from the object including magnification, diminution, vertical and lateral displacement, rotation, elongation, and the like, or a combination thereof. Any suitable means may be employed to form the images, including electronic means such as television, and the optical means hereinafter disclosed, and other suitable means.

Yet another object of the present invention is to provide animation apparatus wherein static portions of the animation scenes need not be drawn on the sheet and wherein no physical overlay of static material over or under the sheet is required. To this end a modified image transmission system is hereinafter disclosed.

It is yet another object of the present invention to provide an apparatus for viewing, projecting, and editing animation wherein the artist may immediately discern the effect of the animation at various stages of completion without photographing it or transcribing the drawings to permanent media.

To this object means are provided for transporting the sheet carrying the sequence of drawings past a viewing area in the proper sequential order. This means may take the form generally illustrated by Sudmann, No. 1,198,598, of Sept. 19, 1916; and Teague, No. 1,292,149, of Jan. 21, 1919, if the sheet is of a material suitable for rolling on reels in the form of a tape.

The present invention generally comprises an improvement over these foregoing patents in that a single sheet of transparent, translucent or opaque material which need not be specially perforated or prepared and which may be of inexpensive material, such as paper, may be utilized both in the production, viewing, and editing of the animation, as well as in transcribing the animation to permanent media.

In utilizing the viewing method, the effect of the animation scenes may be immediately discerned as they are transported in sequence past the viewing area with the aid of an intermittent source of illumination such as a flash tube or strobe light positioned to illuminate the sheet in the viewing area. Along this line any conventional means of firing the flash tube may be utilized and the circuitry required is likewise conventional, with a typical example being shown in the patent to Sabol, Jr., No. 2,589,437, of Mar. 18, 1952.

The triggering system, however, utilized to trigger the circuitry required to fire the light as applied to animated cartoons is most important. In this connection the present invention provides (1) a means whereby scenes which have been badly traced or drawn may be eliminated readily without resorting to splicing or cutting the sheet or losing synchronization, (2) a means whereby the separation distance between successive scenes of animation need not be constant to maintain synchronization, (3) a means whereby the number of frames viewed per second can be controlled without altering the rate of progress of the action by adjusting the separation ditsince, (4) a means whereby new scenes may be inserted between already completed scenes so as to increase the number of frames viewed per second without altering the speed of progress of the action and without resorting to splicing or cutting the sheet or losing synchronization, (5) a means whereby scenes which have been previously eleminated may be simply reinstated, (6) a means whereby acceptable scenes may be refined or improved upon after viewing without delay or expense, and (7) a means whereby the same triggering system may be utilized in producing, editing, projecting, viewing, and in transcribing animation to other media, such as movie film.

Further objects of this triggering system are: (1) to eliminate the necessity for sprocket holes and other permanent registration marks on or through the sheet, (2) to eliminate the necessity of any intermittent mechanical movement of the sheet, and (3) to eliminate any necessity of maintaining the speed of motion of the sheet constant.

It is therefore an object of the present invention to provide an animation technique which includes with each acceptable scene a simple, yet efficient, trigger mark which may be of a removable nature, for operating the strobe viewing, projection, or transcribing system.

The present invention contemplates direct viewing of the sheet illuminated by the intermittent light operated by the trigger system so as to obtain the effect of animation as well as projecting the thus illuminated sheet onto the screen for viewing. A further object of the present invention is to provide a projection system wherein the thus illuminated scenes are projected on a persistent screen, thereby eliminating any objectionable flicker of the image.

Still another object of the present invention is to provide an apparatus for transcribing the animation to permanent media such as movie film or video tape wherein the thus illuminated scenes are photographed by an appropriate camera operated by the triggering system.

Yet another object of the present invention is to provide an animation technique and apparatus wherein drawing, viewing, editing, transcribing and projection may be done on the same machine and whereby the artist can view his progress repeatedly during the process of creation.

It is a further object of the present invention to provide an apparatus wherein each consecutive scene may be traced from a preceding scene, wherein the separation between scenes may be varied at will, wherein magnification or diminution, vertical and lateral displacement, rotation, elongation along a given axis, and other distortions of the preceding scene, or any combinations of the above, may be introduced into the traced scene and wherein production, viewing, editing, and transcribing to permanent media may be done all on the same machine.

Figure 2:
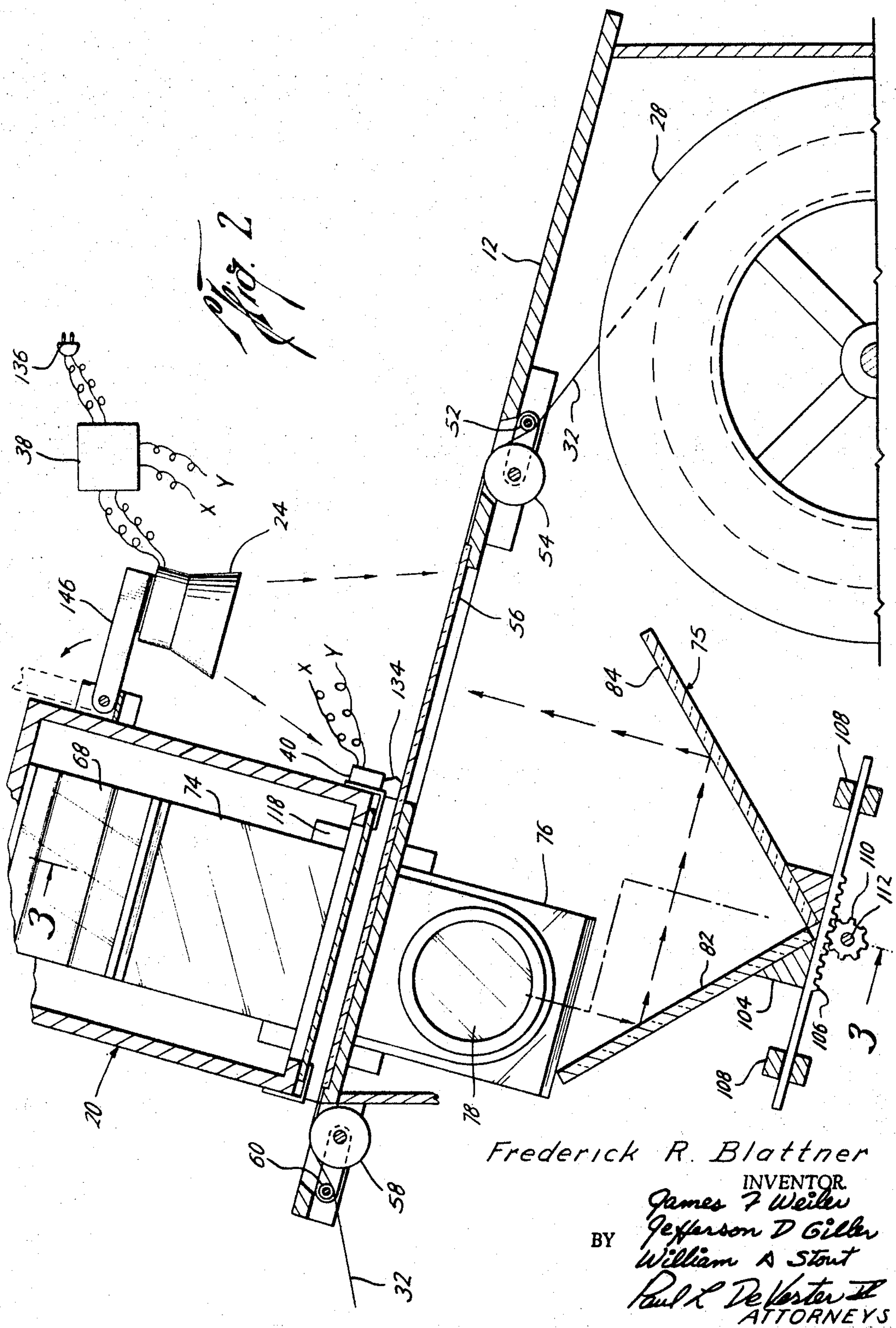
Figure 3:
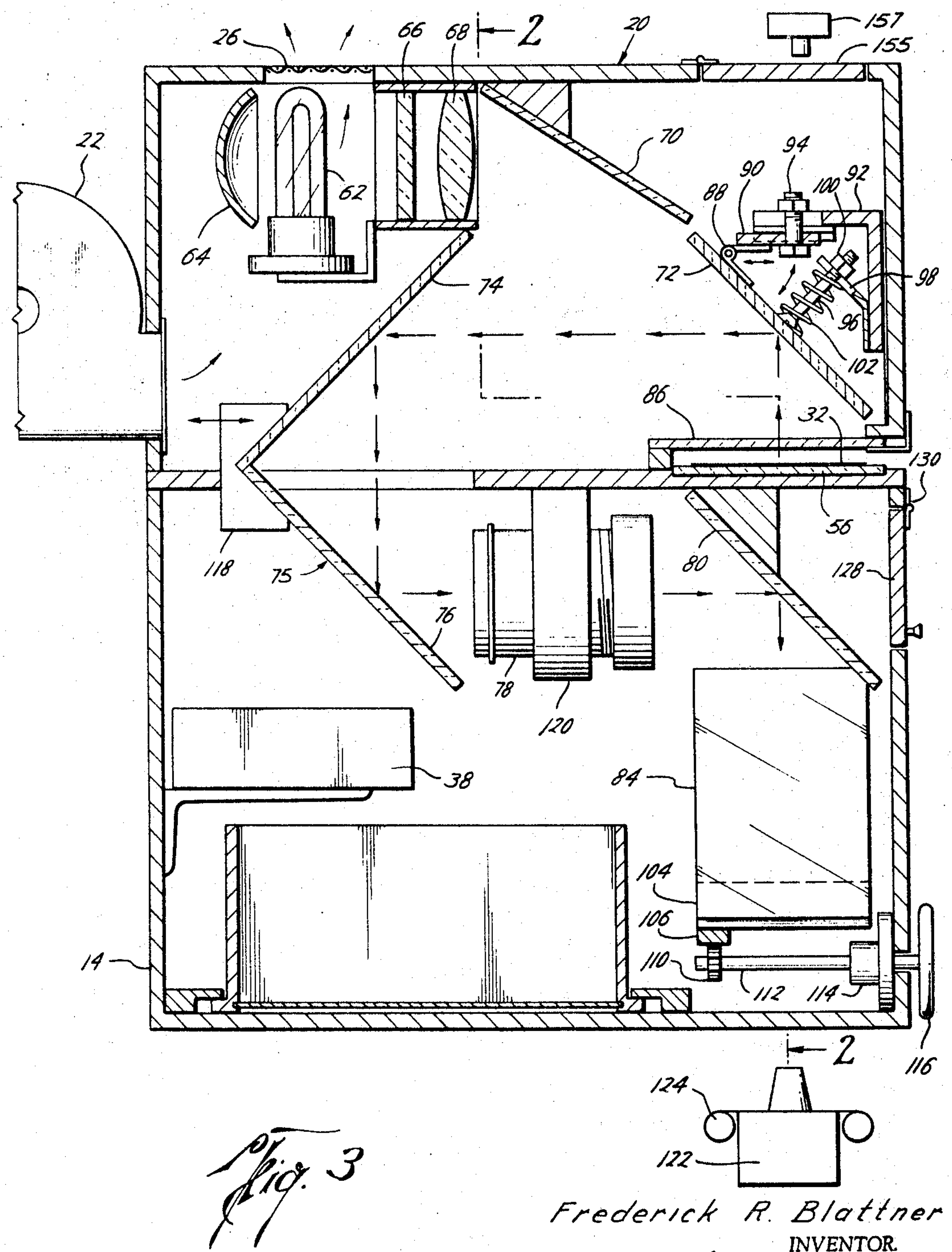
Figure 4:
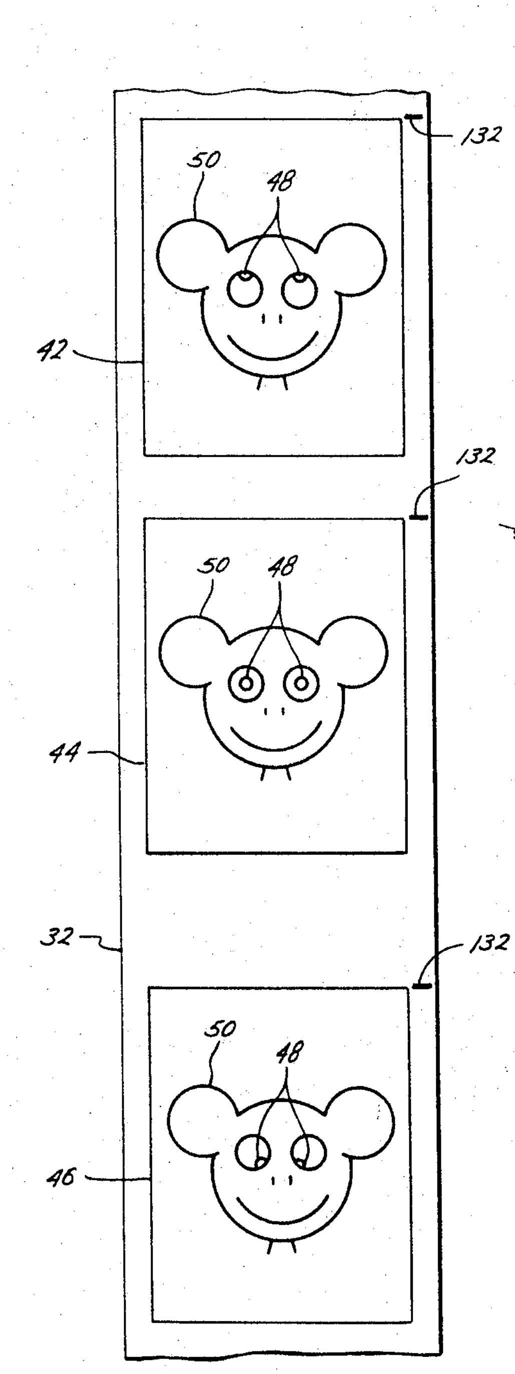
Figure 5:
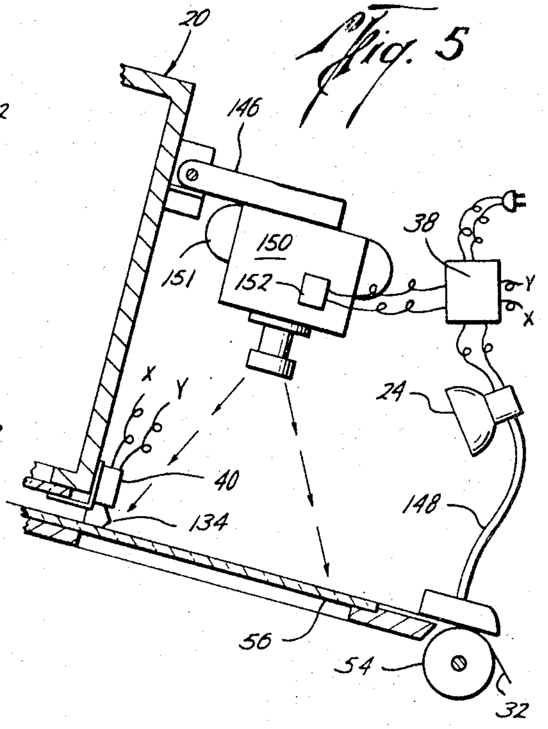
Figure 6:
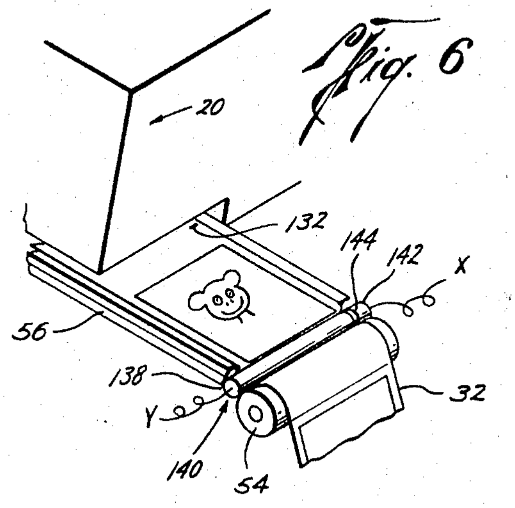
Figures 7, 8, 9:
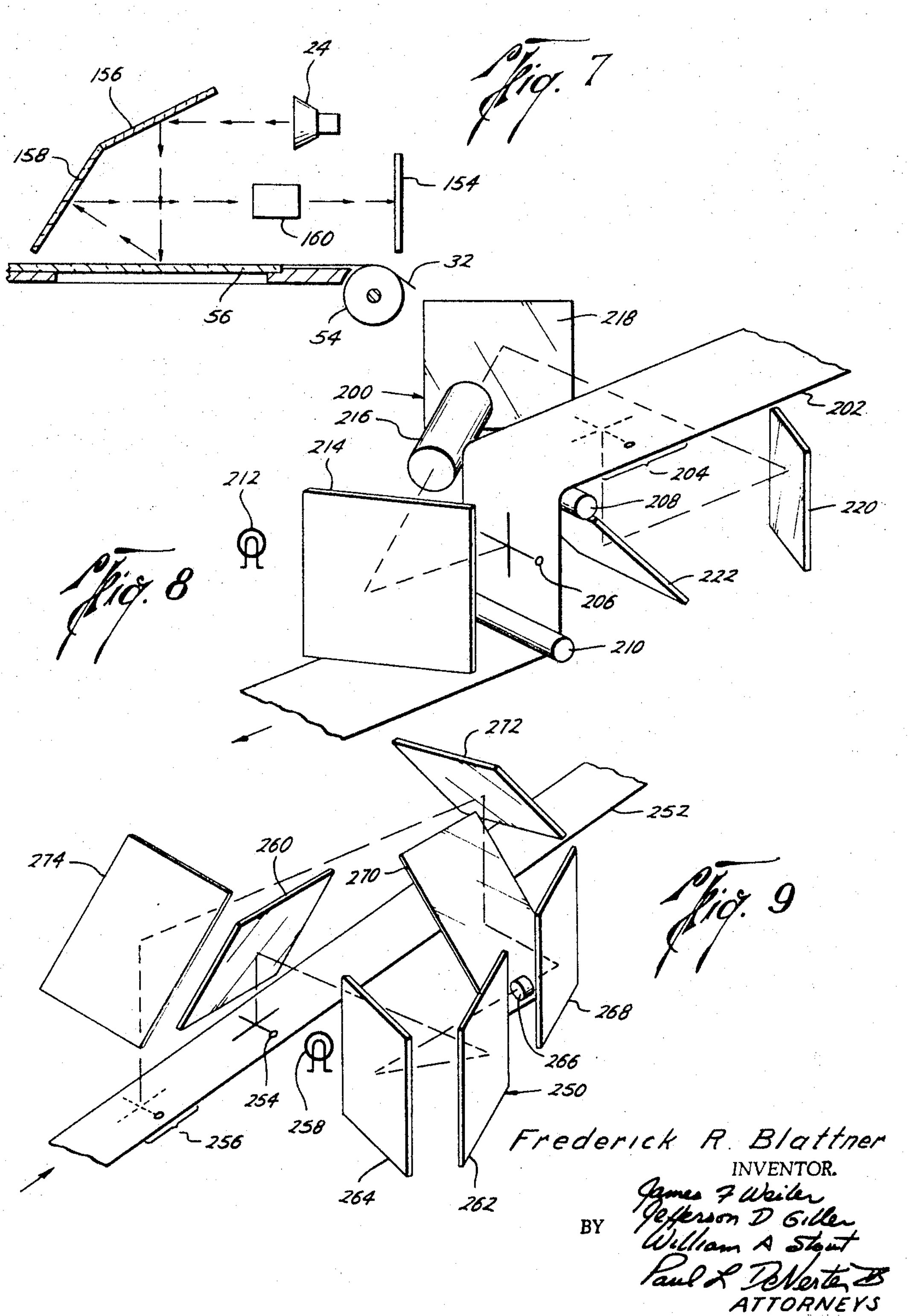

Other and further objects, features, and advantages will be apparent from the following description of presently preferred embodiments of the invention, given for the purpose of disclosure, taken in conjunction with the accompanying drawings, wherein like character references designate like parts throughout the several views, and where:

FIGURE 1 is a partial perspective view of the present invention, particularly showing the artist's work surface, FIGURE 2 is a partial side view of the apparatus of FIGURE 1, taken along the line 2—2 of FIGURE 3, FIGURE 3 is a partial sectional rear view taken along the line 3—3 of FIGURE 2, FIGURE 4 is a view of a section of tape having animation thereon, FIGURE 5 is a side view similar to FIGURE 2 wherein the strobe light is replaced with a camera, FIGURE 6 is a partial perspective view showing an alternate method of synchronization with the trigger marks hereinafter described, FIGURE 7 is a partial side view similar to FIGURE 2 showing a method of opaque projection of a cartoon drawn on the tape, FIGURE 8 is a partial perspective view showing a modified image transmission system, and FIGURE 9 is a partial perspective view showing a further image transmission system for use with opaque sheet material.

The invention generally comprises a means for producing animation on a medium capable of continuous motion past a drawing and viewing area. For definiteness, the medium is shown as being rolled in the form of a tape on reels. It is to be emphasized, however, that this is not a limiting feature of the invention. Modifications involving flexible or pliable media in the form of strips, discs, sheets, etc. are entirely within the scope of the invention, provided the requisite motion may be imparted in some manner thereto.

Likewise, for definiteness, the material composing the sheet is described as paper. It is apparent that acetate film, tinted paper, glass, and any number of other materials, having desired properties, may be substituted without exhausting the scope of the present invention. It is to be particularly emphasized that materials ranging from transparent to opaque and in all gradations of reflectivity, diffusibility, and transmissibility may be used under various circumstances. Furthermore, since no intermittent movement of the tape is necessary when viewing the result, the medium need not be sturdy or expensive, nor it is necessary to provide the medium with permanent registration marks, or sprocket holes.

Referring now to FIGURE 1, the reference numeral 10 generally designates the animation machine of the present invention, which includes the drawing table 12, frame 14, storage drawer 16, and legs 18, which may be of any conventional height. Mounted on the upper portion of the table 12 is a housing 20 which generally contains the optical apparatus to be hereinafter described, and to which is attached a blower 22 and strobe light, or flash tube 24 mounted on the bracket 146. Mounted within the top of the housing 20 is port 26 which is utilized to exhaust hot air moved by the blower 22.

Rotatably mounted on the frame 14 are the reels 28 and 30 which contain a supply of tape 32 on which animation is drawn. As shown, mounted on the axes of the reels 28 and 30 are means for rotating the said reels, here shown as the cranks 34 and 36, although any conventional means may be utilized for moving the tape between the reels, such as a motor, or the like. Also shown mounted on the frame 14 is the strobe light 24 amplifier-firing circuitry 38 which may be of any conventional design. Shown mounted on the housing 20 is the trigger contactor 40 which is utilized to trip the amplifier-firing circuitry 38 and, therefore, ultimately to fire the flash tube or strobe light 24.

Referring now to FIGURE 4, a strip of tape 32 is shown having three successive scenes 42, 44, and 46, thereon. As is well known in the cartooning or animating art, a multiplicity of scenes are typically drawn in which the movement or animation to be characterized consists of changing or modifying one or more features in successive states. Thereupon, when each of these scenes is viewed in rapid succession, the human eye perceives the effect as a gradual movement in a most lifelike manner. Thus, it is seen that the eyes 48 of the cartoon character 50 gradually shift from an upward position in scene 42 to a center position in scene 44, and finally to a downward position in scene 46.

FIGURE 4, in addition to illustrating the basic technique of animation, further illustrates one of its inherent problems, namely that each of the non-animated parts of each scene must be duplicated in each successive scene, and this duplication must not only be essentially identical, but it must be properly spaced with respect to the bounds of the scene. In one aspect, the present invention is directed toward a simple and effective method and means for easing the skilled artist's repetitive work.

Thus, instead of producing each of these scenes 42, 44, and 46 on separate sheets of paper, and exactly positioning each successively beneath a camera and thereafter exposing them, the present invention utilizes an optical transfer system, whereby after the first scene, such as 41, is drawn, the next succeeding scene, such as 44, may be readily traced therefrom, with whatever modifications are necessary to produce the desired animation, such as the position of the eyes 48. Further, through the use of the present invention, the various scenes may be set forth on tape 32, which may be a most inexpensive material, such as adding machine tape. Therefore, the basic aspects of this optical image transmission system will now be explained.

Referring again to FIGURE 1, the reels 28 and 30 are appropriately placed in the frame 14 of the animation machine 10, with the supply of tape 32 wound on reel 28. Thereupon, and referring now to FIGURE 2, the tape 32 is inserted under the tension roller 52, over the table roller 54, across the transparent or translucent (glass) drawing surface of plate 56 of the table top 12, under the housing 20, over the table roller 58, under the tension roller 60 and on to take-up reel 30 (better seen in FIGURE 1). Thereupon, in any appropriate medium (paint, ink, etc.), the artist draws the first scene on the tape 32 while it is over the transparent plate 56. Then, the reel 30 is rotated by any appropriate means, such as the crank 36, so that the scene just drawn is moved along the plate 56 until it is beneath the housing 20. Now, the next successive scene may be drawn.

However, in order to exactly duplicate that part of the just finished scene in the next successive scene, it is necessary to transmit an image of the first scene back to the position for the second successive scene, without interfering with the artist's work room. In the present embodiment, this is done by means of an opaque projector and a particular optical image transmission system, both hereinafter explained.

Referring now to FIGURE 3, a back view of the animation machine 10 is shown, more particularly a view along the line 3—3 of FIGURE 2. A projection bulb 62 is appropriately mounted in the housing 20. Arranged adjacent to the projection bulb 62 is a light gathering and reflecting mirror 64 which directs the light produced by the bulb 62 through a heat shield 66 and condenser lens 68. Thereupon, by virtue of the mirror surface 70, the light is projected downwardly and onto the tape 32, beneath the housing 20, which at this time contains the previously drawn scene. Thus, the light falling on the scene is reflected upwardly to the reflecting surface 72, reflected 90° and across to the reflecting surface 74, reflected 90° and down to the reflecting surface 76, reflected 90° and through the lens 78, thence to the reflecting surface 80, reflected 90° and thence downwardly to the reflecting surface 82 (best seen in FIGURE 2), across to the reflecting surface 84 (also seen in FIGURE 2), and upwardly through the plate 56 to the tape 32. The general optical path is shown by means of the arrows in FIGURES 2 and 3, while the entire system may be seen in perspective in FIGURE 1, with the exception of the lens 78, which was omitted from FIGURE 1 for the sake of clarity. The effect of the mirror system described is to transmit an erect, upright image from one position on a plane to a second position on the same plane. For ease of reference the optical image transmission system will be referred to as 75.

The various mirror surfaces may, of course, constitute the hypotenuse of an appropriate prism, or they may constitute various silvered or half-silvered surfaces of a plain, flat, glass mirror, or the like. In any event, their function is to reflect light.

It should be noted further that the mirror surfaces 74 and 76 define an angle of 90° and likewise so do the mirror surfaces 82 and 84. Thus, those V-surfaces 74, 76 and 82, 84 function to turn the image exactly 180°. It should also be noted that the optical path length from the tape 32 via mirror surface 72, mirror surface 74, mirror surface 76, to the optical mid-point of lens 78, is exactly equal to that from the optical mid-point of the lens 78 via mirror surface 80, mirror surface 82, mirror surface 84, to the tape 32. In this manner, no magnification of the image being transmitted is realized. Therefore, it is extremely easy for the most inexperienced artist to simply trace over the transmitted image on the next section of the tape 32 and thereby duplicate the scene previously completed and now beneath the housing 20. At this time, the artist may make the simple modifications necessary, such as those shown in FIGURE 4, so that apparent movement will appropriately result.

Referring further to FIGURE 3, it will be noted that the opaque projector bulb 62 is cooled, and prevented from overheating, by means of the blower 22 which exhausts the hot air through the port 26 in the top of the housing 20. Further, it will be noted that a dust glass 86 is provided within the housing 20 over the tape 32, thereby providing some protection to the various mirror surfaces. As an aid in the construction of the apparatus, the mirror surface 72 is shown adjustable so that exact reflection angles may be achieved. Thus, appropriately fastened, such as by glue, to the back of the mirror surface 72 is a hinge 88 which is also attached to the bracket 90. Further, the bracket 90 is attached to the brace 92 by an appropriate fastening means, such as the nut and bolt 94. Therefore, by loosening the nut and bolt 94, the bracket 90, and therefore the hinge 88 and mirror surface 72, may be adjusted laterally. Further, also suitably attached to the back of the mirror surface 72 is a stud 76 which fits through a slot 98 in the brace 92. An appropriate nut 100 is placed on the stud 96, as is a compression spring 102. Therefore, simply by rotating the nut 100, the length of the stud 96 is changed, thereby pivoting the mirror surface 72 about the fulcrum of the hinge 88, to provide additional adjustments for the mirror surface, if necessary. It is understood that each of the various mirror surfaces may be made similarly adjustable.

Referring now to FIGURE 2, it is seen that the mirror surfaces 82 and 84 are appropriately attached to a block 104 to which is, in turn, attached a rack 106 mounted for lateral movement in the guides 108. Engaged with the rack 106 is a pinion gear 110 which is attached to the shaft 112. Referring now to FIGURES 1 and 3, it is seen that the shaft 112 is journaled in an approriate bushing 114 which is attached to the frame 14. The outer extremity of the shaft 112 extends through the frame 14 and terminates in an appropriate rotating means, such as the hand wheel 116. Therefore, by rotating the hand wheel 116, the shaft 112 and pinion 10 are rotated, causing the rack to shift laterally, and thereby laterally shifting the mirror surfaces 82 and 84.

Referring to FIGURE 2, it is seen that the effect of this shift is to transmit the image by a greater or lesser distance along the tape. Thus, the artist may vary at will the separation between successive scenes on the tape. It will be noted that this adjustment does not affect the focus of the optical image transmission system, nor does it affect the position of the transmitted image in the direction of the width of the tape. As will become apparent hereinafer, the spacing between scenes need not be uniform to insure synchronization. However, since wider spacing allows fewer frames to be viewed per second for the same rate of progress of action on the tape, the adjustment of 116 will give the artist control over the number of frames per second. It is often convenient to begin the design of animation with widely spaced scenes. By this method a sketch of a long animation may be quickly drawn and viewed. Later, new frames may be inserted between the already completed frames by adjusting the hand wheel 116 for a shorter separation distance and tracing new scenes between those already completed. This refinement increases the number of frames viewed per second without altering the rate of progress of the action. Objectionable flicker and jumpiness is thereby removed. An unskilled artist may accomplish this part of the animation with little difficulty.

Thus, it is seen that the basic animation device 10 comprises a roll of tape 32 and the optical image transmission system 75 whereby a previously drawn scene may be transmitted to a new section of tape whereby further, subsequent scenes may be traced with appropriate modifications for animation purposes. To the basic device so far described, various attachments or modifications may be added.

Some modifications may be necessitated by the use of various materials for the tape 32. In certain cases it may be desirable to illuminate the tape under the housing 20 by transmission rather than by reflection. This form of illumination is particularly desirable when transparent tape having low reflectivity is used.

It may be easily accomplished by relocating the source of illumination to a position outside the door 128. The door 128 is provided so that light may impinge on the rear surface of reflector 80. It is possible to cause both the front and rear surface of reflector 80 to reflect. Thus, light may be directed upward from the rear surface of 80, through the transparent plate 56, and ultimately pass through the tape 32.

The image thus illuminated may be optically transmitted by the system 75 as previously described. It should be apparent that a combination of the two types of illumination may be accomplished by the use of two sources of illumination simultaneously.

Another modification which may be necessitated by the use of certain materials for the tape 32 in the use of a diffusing plate (e.g., ground glass) for the plate 56. This is useful mainly when tape having low diffusibility is employed. Its chief effect is the formation of a clearer and more intense image at the drawing area.

It may also be necesary, in rare instances, to substitute a plate having the property of transparency under the housing 20 and diffusibility outside 20 for the plate 56. Likewise, the reverse situation of diffusibility inside and transparency outside may be called for in order to obtain the clearest image.

Still another modification is directed toward a means to provide dolly or tracking shots, or what to the cartoon observer appears to be these movements.

As is well known in the cartoon art, it is often desirable to have the image of the character appear to come closer to the camera or to move further away. These shots are called tracking shots or dolly shots, and they may be combined with other complex movements such as panning, or the like. In cartoon work, when it is desired for the cartoon figure to grow closer or move further away, it is necessary for each successive piece of art work to be drawn larger, or smaller, as the case may be. In the present invention, a method and means is provided whereby the magnification from the preceding to the succeeding scenes may be varied, thereby allowing the artist to trace the optically magnified or diminished scene, without having to approximate.

Referring now to FIGURE 3, one means for so doing may be simply illustrated. Previously, the optical path length from one side of the optical center of the lens 78 was described as being equal to the optical path length from the other side of the center of the lens 78 with reference to the plane of the tape 32 on the plate 56. It is now apparent that if the optical path lengths are changed, and the lens 78 refocused, magnification or diminution of the optically transmitted image will result. To vary the optical path length, it will be noted that the V-mirror 74 and 76 are mounted on the block 118, which is in turn slidably mounted for lateral movement on the frame 14. Therefore, the block 118 may be moved back and forth in the direction of the double-headed arrow, causing the path length from the tape 32 via the surfaces 72, 74, 76, and optical center of the lens 78 to be increased or decreased. Thereupon, when the lens 78 is appropriately refocused, the image reflected on the new portion of the tape 32 is appropriately magnified or diminished. It should be noted that, without further adjustment, each succeeding scene will be automatically changed in a like amount until the path length is again modified.

Yet another means may be provided for magnifying or diminishing the optical image which is transmitted. Thus, instead of laterally moving the mirror surfaces 74 and 76, a zoom lens may be utilized for the lens 78. As is well known in the optical art, a zoom lens may be so constructed that the focal points will remain the same on either side of the lens, but the focal length and optical center may be varied, thereby resulting in magnification of one image with respect to the other. Thus, when the zoom lens 78 is appropriately adjusted within its mounting 120, which is attached to the frame 14, the present invention may be utilized to produce tracking or dolly shots. Therefore, it is seen that the present invention advantageously provides a simple, yet effective, means for duplicating one of the more complicated cartoon or animation effects.

The dolly, or tracking shot, produced as herein described, actually constitutes only one of a whole class of special effects made possible by the apparatus of the present invention.

It will be noted that the dolly, or tracking shot, was produced by means of an optically transmitted image into which a distortion had been introduced. The distortion in this case was a magnification or diminution of the image.

It is clear that many other distortions are possible. Further, many of the possible distortions can be traced successively, by even the most unskilled artist, to yield striking animation effects which have hitherto been difficult or impossible to produce.

For example, by tilting the various reflectors out of their respective planes by means of the mountings provided it is possible to introduce a slight rotation of the image relative to the object. Successive tracing of this image will yield a rotating cartoon effect.

As a further example, lateral shifts in the image, with respect to the object, can be used to depict constant motion in a given direction. These lateral shifts may be obtained by altering the angles of the various reflectors.

A further range of distortions may be introduced into the optical transmission system by the addition of distorting elements in the optical path of the transmission system. To this end, the door 162 has been included (see FIG. 1). The insertion of bent glass, transparent wedges, cylindrical lenses, and other translucent elements through door 162 into the optical system 75 will give rise to many distortions which can be exploited by the designer of animation sequences.

Yet another modification, or addition, to the present invention may be utilized whereby the time consuming task of tracing static background material may be considerably reduced. This means involves the superimposition of static background material on the tape 32 when it is in position for drawing (or for viewing or projecting as hereinafter described) on the plate 56.

Referring now to FIGURE 4, it will be noted that none of the various parts in the scenes 42, 44, and 46 vary in the sequence depicted, with the exception of the eyes 48. Thus, it is seen that if a means is provided whereby only the eyes 48 need be drawn, or any other appropriate moving part, a considerable saving in time and effort will be effected. Further, it is apparent that considerable skill is involved in drawing all of the static material on the first scene, so that it may be appropriately traced by means of the optical transmission system 75, above described, and therefore a rather talented artist must first produce the primary scene, usually with all of the static material. Thereafter, a less skilled artist may be utilized to trace the repetitive material and add the small modifications in sequence so as to produce animation. Consequently, it would be very advantageous to provide a method whereby the presence of the skilled artist is not required even to produce the primary scene, such as 42. To this end, the following additions are directed.

If particularly useful static material (hereinafter it is understood that the static material includes both common background material as well as various features which do not move during a sequence of scenes) may be conventionally photographed so as to provide an image, then the image may be projected onto the tape 32 while on the artist's working surface 56, thus attaining the objective. Four means for so doing are here illustrated. Referring now to FIGURE 1, it will be noted that a projector 122 is placed beneath the animation device 10 so that an image projected from an image bearing means, such as the film 124, is focused and projected through the mirror surface 84 and plate 46 on to the tape 32. In this situation, the mirror surface 84 may constitute what is conventionally known as a half-silvered mirror whereby optical images will reflect thereon, as well as being transmitted therethrough. By the use of this projecting device 122, it is readily seen that static background material may be placed upon the tape and readily traced by an unskilled artist, and thus effect a considerable labor saving. Further, as the scenes develop on the tape 32, other material may be similarly projected thereon, and traced, for background effect.

Yet another means for placing static background material on the tape 32 at the plate 56 is by means of the projector 126 containing a suitable image bearing surface, such as that shown as 124 on the projector 122, which projector 126 is arranged to project through the door 128 and onto the mirror surface 80. The door 128, also seen in FIGURE 3, is suitably mounted, as by the hinges 130 for removal for optical access to the mirror surface 80.

It is assumed for the present modification that the mirror surface 80 is reflective on both sides and that it is held in position by its edges so that no obstruction to the passage of light to and from the rear surface of 80 exists. It is also noted that the plate 56 which supports the tape 32 extends under the housing 20.

Referring now to FIG. 3, it will be seen that light from the projector 126 may pass through the door 128 and be reflected via the rear surface of reflector 80 through the plate 56 and onto the tape 32. If the tape is made of translucent material, the image formed on the tape will be transmitted along with drawings on the tape by the optical image system 75 to the drawing position.

Yet another means for placing static background material on the tape 32 at the plate 56 is to locate a projector such as 122 in place of the camera 150 shown in FIGURE 5.

Yet another means for placing static background material on the tape is to locate a projector 157 similar to 122 directly above the reflector surface 72. In this modification the reflector surface 72 is of the half-silvered variety. It is again assumed that reflector surface 72 is supported by its edges, as mentioned in connection with reflector surface 80, rather than by the hinge mechanism shown in FIGURE 3.

Referring to FIGURE 3, light from the projector 157 may pass through the door 156, through the reflector 72, and through the dust cover 86 to the tape 32. The image thus formed, along with material on the tape 32, will thereupon be optically transmitted by the optical image transmission system 75 back to the drawing area and tape 32.

It will be noted that the four means described above for optically adding static background material allow the static material to be added either from above or below the tape and either before or after the optical image transmission system. The relative advantages of the four methods depend largely on the properties of the tape. Clearly, the means involving projection from below will not give good results with highly opaque tape materials.

Another modification of the four basic means herein discussed involves the substitution of a diffusive plate, such as ground glass, for the transparent plate 56. This modification may be employed with particularly good results when the tape 32 is made of transparent materials having low diffusibility.

It will be apparent to those skilled in the art that other arrangements, than the four outlined herein, may be employed to project background material on to the tape 32. It is clear that the scope of the present invention includes all such arrangements, the forms outlined here being examples having particular usefulness.

Referring again to FIGURE 4, it will be noted that registration or trigger marks 132 are shown on the tape 32. These marks serve as a means of synchronization for viewing nad projecting the finished animation on the tape 32, as well as a means for deleting any particular scenes, simply by eliminating the marks 132. Thus, to view the finished animation scenes 42, 44, and 46 which are drawn on the tape 32, the tape is appropriately placed on the reel 28, seen in FIGURE 1, and threaded through the various rollers 42, 54, 58, and 60 on to the take-up reel 30, and, of course, over the plate 56. As previously mentioned, the trigger contactor 40 is appropriately mounted on the housing 20 and electrically connected to the electronic flashing apparatus 38 which is in turn electrically connected to the strobe lamp 24. Thus, and now referring to FIGURE 2, it is seen that the trigger 40 generally comprises two fingers 134 which are electrically connected by points $x$ and $y$ to corresponding points $x$ and $y$ leading to the electronic apparatus 38, which is in turn connected to an appropriate line power source through the connecting means 136, and to the strobe light 24. Therefore, when a conducting mark 132 causes the fingers 134 to complete a circuit, the electronic apparatus 38 is triggered and appropriately fires the strobe light 24, thereby illuminating the particular scene then on the plate 56. Then, as the rotating means 36 is operated, and the take-up reel 30 rotates, drawing a new portion of tape 32 along the plate 56, the strobe light 24 again fires when the next mark 132 completes the circuit between the fingers 134. In this manner, it is now apparent that each scene is briefly illuminated, and if this is done in the range of 10 or more flashes per second, then persistency of the observer's eye leads to the effect of an animated sequence of scenes.

The trigger marks 132 must, of course, comprise conducting marks, such as would be made by an ordinary graphite pencil which will appropriately trigger the electronic circuit 38 by closing a circuit through the contactor 40 and fingers 134. Further, in order to insure synchronization and placement of one scene in the same relative position as the preceding scenes, after the first trigger mark is drawn on the original scene, each additional mark may be simply traced as it is optically transmitted back to a new portion of tape, as previously described with the remainder of the scenes 42, 44, and 46. Therefore, advantageously, the artist may view the progress of the work which has been drawn, at any time, simply by rewinding the completed work on to the original reel 28 and thereafter energizing the electric circuit and feeding the tape across the plate 56 on to the take-up reel 30. Further, if it is found that any particular scene should be deleted, it may be simply done by erasing the mark 132 on the tape 32, thereby preventing illumination of that scene by the strobe light 24.

Again referring to FIGURE 4, it will be noticed that the spacing between scenes 42 and 44 is not identical with the spacing between scenes 44 and 46. This illustrates a further advantage of the present invention, wherein accurate spacing between the various scenes is not required. Instead, when viewing or projecting the completed animation, the flash tube, or strobe light 24, is not energized until the mark 132 reaches the fingers 134 of the trigger mechanism 40. Thus, synchronization problems, such as might be found with pre-placed sprocket holes, are avoided, and instead synchronization may be readily effected simply by tracing the appropriate trigger mark while the preceding scene is itself being traced when under the housing 20 of the optical image transmission system 75.

It should also be noted that previously drawn scenes from other sequences may be readily spliced into the animation presently being drawn, simply by cutting the tape 32 and splicing in the further appropriate scenes. Again, no problem of synchronization exists, nor is any particular spacing necessary, for the trigger marks 132 constitute the eventual trigger for the illumination when viewing or projecting the animation. Likewise, it should be noted that the animation may be completed in steps, such as, for example, by completing the sequence in black and white and then adding one or more colors, and viewing immediately the effect thereof in the previously described manner.

Referring now to FIGURE 6, an alternate means of triggering the electronic apparatus 38 is shown. In this modification, the trigger mechanism 40 has been eliminated from the housing 20, and instead, a split roller contactor 140 has been mounted adjacent the door 54.

The split roller contactor 140 comprises conducting portions 138 and 142, separated by an appropriate insulator 144. Appropriately connected to the conducting portions 138 and 142 are the leads $x$ and $y$ which connect with the electronic apparatus 38 in the manner previously described for the fingers 134 and trigger contactor 40. In the use of the split roller contactor 140, it is seen that the conducting mark 132 is sufficiently wide to bridge the insulator 144, whereby the circuit between $x$ and $y$ is completed, thus triggering the strobe lamp 24 to illuminate the completed scenes on the tape 32.

Referring now to FIGURE 5, a means of transcribing the completed animation on the tape 32 to a different medium is shown. In this instance, the strobe light 24 is removed from the bracket 146 and placed on an appropriate stand 148 and adjusted whereby it will illuminate scenes on the plate 56. A conventional movie camera 150, having single frame exposure provision, is mounted on the bracket 146. Mechanically connected to the camera 150 is an actuating means, such as the solenoid 152, which is electrically connected to the electronic apparatus 38, in a conventional manner. Further, the shutter operation of the movie camera 150 is appropriately synchronized with the strobe 24. Therefore, when the trigger mark 132 engages the fingers 134 of the trigger 40, as before, the electronic apparatus 38 causes the solenoid 152 to open the shutter of the camera 150 and fires the strobe light 24, thereby exposing the film 151 in the camera in a conventional manner. Thereafter, as the tape-up reel 30 continues to move the tape 32, and during the interval between flashes of the strobe light 24, the conventional movie camera 150 advances the exposed film 151 and brings a new frame into position for subsequent exposure by the next scene on the tape 32. Thus, the present invention contemplates a simple and effective means for transcribing completed animation on the tape 32 to a different medium, such as movie film 151, within the camera 150.

In this connection, it should be noted that the speed and continuous movement of the tape 32 will be recorded by the camera 150 as though the tape were appropriately stopped in a synchronized position beneath the camera. This is due to the short time duration of the flash of the conventional strobe light 24, which effectively stops all but the very fastest motion. Further, the sequence may be transcribed to film at any appropriate speed of the tape 32 without regard to the final projection speed of the film 151 within the camera 150. Therefore, it does not matter that the tape 32 surface speed may vary as the size of the reels 28 and 30 vary when the tape 32 is moved from one reel to the other. Further, it should be noted that when a particular scene, such as scene 44 in FIGURE 4, is desired to be deleted from the movie film, this may be simply accomplished by removing the mark 132 adjacent the said scene 44, and thus eliminating a flash from a strobe light 24 and operation of the shutter of the camera 150 when the said scene 44 passes the trigger 40.

In addition to directly viewing the complicated animation on the tape 32 as the strobe lamp 24 is triggered by the trigger marks 132, it is also possible to project the completed animation on an appropriate viewing screen. Referring now to FIGURE 7, the tape 32 is shown placed over the roller 54 and plate 56 in a manner similar to that previously shown in FIGURES 1, 2, 5, and 6. In this instance, the strobe light 24 is mounted to illuminate through an opaque projector and transfer the reflected image to a screen 154. Thus, the beam which is appropriately triggered from the strobe light 24 in any of the previously mentioned manners by the tape 32, is directed by the mirror 156 to the tape 32, whereafter it is reflected from the mirror surface 158 through an appropriate lens 160 to a screen 154. The lens 160 may, of course, magnify or diminish the reflected image as desired by the viewer, and the viewer may view the screen, either by transmission or by reflection as desired by the viewer.

As before, it is possible to illuminate the tape, either by transmission or reflection, or by a combination of these means, for purposes of projection.

A modification of the foregoing viewing means involves the use of a screen 154 which has been coated with an appropriate luminescent or persistent material. After the illumination of a scene by the strobe lamp 24, the persistent screen 154 continues to luminesce the scene which is briefly illuminated by the strobe lamp 24, thereby reducing any objectionable flicker to a viewer.

Referring again to FIGURE 1, it will be recalled that the use of the projectors 122, 126, and 157 were described for the purpose of adding background material to the tape 32 as the various scenes are drawn. It should now further be apparent that the projectors 122, 126, and 157 may likewise be utilized to add background material to the finished tape, without actually drawing the said material, for the purposes of viewing, projecting, or transcribing the finished animation to film. Thus, and referring now to FIGURE 4, if only the eyes 48 are drawn on the tape 32, it is apparent that the remainder of the character 50 may be simply projected on to the tape 32 over the plate 56 when it is desired to view the finished animation. When directly viewing the animation, some means for interrupting the optical image projected from the projector 122 or 126 must be utilized while the tape is being moved so that the transferred image of the background material is not constantly present. In any event, it is well within the skill in the art to replace the usual projector bulb within the projector 122, 126, or 157 with a conventional strobe light which is fired similarly to that of strobe light 24 with synchronization from the trigger marks 132.

Referring now to FIGURE 8, yet a different version of the image transmission system is depicted. For the sake of clarity, all reflecting surface mounting details, and framework have been eliminated. This image transmission system 200 is particularly useful with flexible transparent or translucent sheet material, such as tape 202, because the entire image transmission system is placed below the plane of the subsequent scene area 204.

Because of the relative simplicity of the image transmission system 200, it is felt that little explanation is necessary, and the following summary is sufficient. The first scene 206 is drawn or otherwise impressed on the tape 202, whereupon the tape is moved forward so that scene 206 is run over roller 208 and stopped between rollers 208 and 210. At this point, it is to be noted that the tape has been rotated or bent 90° and is in the position shown in FIGURE 8. It is now apparent that the tape 202 may be run under or over roller 210, as a matter of design depending on the placement of the appropriate take-up reel.

Scene 206 is now illuminated, as by the light source 212, and the image thereof is translated and rotated by reflecting surface 214, lens 216, reflecting surfaces 218, 220, and 222 so that the image is transmitted and focused on the tape 202 from the bottom at area 204. Thereupon the next scene may be traced with appropriate modifications to produce animation. Any of the various adjustments, distortions and modifications described with reference to image transmission system 75 may be incorporated with system 200, and it is now apparent that an image transmission system has been produced which has reduced the number of reflecting surfaces, eliminated protuberances above the drawing surface, and which is relatively simple.

Referring now to FIGURE 9, yet another modification of the image transmission system is shown, again wherein all reflecting surface mounting details and framework have been eliminated for clarity. This transmission system 250 is particularly useful for opaque sheet material, such as tape 252, as the upright erect image of the previously drawn scene 254 is transmitted to a succeeding portion or drawing area 256 without requiring conductance through the tape 252.

In this embodiment, a scene 254 is drawn or otherwise impressed on the tape 252 in the drawing area 256, whereupon the tape is transported to the position shown in FIGURE 9. Thereupon the scene 254 is illuminated, as by the light source 258, and the image thereof is rotated and translated by means of the reflecting surfaces 260, 262, 264, lens 266, and reflecting surfaces 268, 270, 272, and 274 so that the image is transferred and focused on the tape 252 from the top at area 256. Thereupon the next scene may be traced with appropriate modifications to produce animation. Again, any of the various adjustments, distortions and modifications described with reference to transfer system 75 may be incorporated with system 250, and it is now apparent that a transmission system has been produced which is useful with opaque sheet material.

Both of the preceding systems are also shown without the addition of strobe lights, cameras, or trigger marks as it is felt to be now apparent that these features may be incorporated in a manner identical to that previously described with reference to FIGURES 5 and 6.

In use, tape 32 is appropriately rolled upon the reels 28 and 30 after being threaded through the rollers 52, 54, 58, and 60, as well as being led across the top of the plate 56 and beneath the housing 20. Thereupon, the first scene, such as scene 42 shown in FIGURE 4, is drawn upon the tape 32. Then, the appropriate rotating means, such as the crank 36, is activated, moving the tape 32 and the finished scene 42 beneath the housing 20. Thereupon, the optical image transmission system 75, through the series of mirror surfaces and lenses previously described with reference to FIGURES 1, 2, and 3, transmits the previously drawn scene 42 to a new section of tape 32 which is over the plate 56. The artist then traces over that portion of the scene 42 which is to remain static in the succeeding scene 44, and appropriately modifies the particular part which is to be animated, such as the eyes 48, thus completing the scene 44. Then, in the manner just described, the scene 44 is moved beneath the housing 20 and optically transmitted back to a new portion of the tape 32 so that scene 46 may be prepared. This process is continued until the sequence of animation is completed. It must be remembered that each of the trigger marks 132 is appropriately traced from the preceding scene.

Thereafter, at any time, the artist may view the sequence simply by respooling the completed animation on the tape 32 back on the reel 28, and then energizing the electronic circuitry 38 and continuously moving the tape 32 from reel 28 to reel 30. As this occurs, the trigger contactor 40, or its alternate 140, triggers the electronic circuit 38 and fires the strobe light 24, thereby briefly illuminating each scene which will then appear to an observer as an animated sequence. Further, appropriate background material may be projected in addition to that drawn on the various scenes 42, 44, and 46 by means of the projectors 122, 126, or 157. Any scenes which dissatisfy the artist may be simply removed from the illuminated sequence simply by removing the conducting mark 132.

Of course, at any time, the artist may add color to the various scenes simply by painting, or otherwise depositing the said color on the tape 32. Likewise, the finished sequence may be translated to movie film, simply by mounting the camera 150 on the bracket 146, and proceeding in the manner previously described with reference to FIGURE 7.

As the use of the systems 200 and 250 of FIGURES 8 and 9 is similar to the foregoing, no further explanation thereof is deemed appropriate.

Thus, it is seen that the present invention provides a means for an animation technique which is relatively simple, yet quite effective, and provides all of the previously mentioned advantages.

The present invention, therefore, is well adapted to carry out the objects and attain the ends and advantages mentioned, as well as others inherent therein. While presently preferred embodiments of the invention have been given for the purpose of disclosure, numerous changes in the details of construction, and the combination, shape, size, arrangement of parts, and uses, may be resorted to without departing from the spirit and scope of the invention as hereinafter claimed. It is to be noted that the term "transmit" in the claims which follow has been particularly defined hereinabove.

What is claimed is:

1. An optical transmission system for an animation device for use in producing a sequence of scenes comprising an elongate plane transparent drawing surface, an illuminating means mounted over a first portion of the drawing surface, and a series of reflecting surfaces and a lens mounted optically within said series and positioned to transmit an upright erect image from the top of the first portion of the drawing surface to a second portion of the top of said drawing surface through said transparent drawing surface.

2. An animation device comprising:
- a plane drawing surface,
- a strip of tape transportable over said surface,
- means for transporting the tape in steps over said surface,
- an optical transmission system including a series of mirrors and a lens positioned to transmit an upright erect image of a synchronization mark and a first scene drawn on the transported tape to a subsequent portion of the tape for tracing a subsequent scene and synchronization mark,
- synchronization mark contactor means adjacent the surface contacting the original and traced synchronization marks when transported thereby,
- momentarily illuminating tape means responsive to synchronization marks contacted by the contactor means and positioned adjacent the surface, and means for continuously transporting the tape across the surface, whereby the scenes on the tape are momentarily illuminated.

3. The invention of claim 2 including a motion picture camera positioned adjacent the surface and responsive to synchronization marks contacted by the contactor means.

4. The invention of claim 2 including:
the momentarily illuminating tape means including a projector, and
a screen, whereby said momentarily illuminated scene is projected on said screen.

5. The invention of claim 2 including a projector optically connected to the transmission system, whereby an image may be projected on said tape from said projector as said drawn image is transmitted.

6. An animation device for use in producing a sequence of scenes comprising:
an elongate sheet,
illuminating means mounted adjacent a first portion of the sheet,
a drawing area beneath a subsequent portion of the sheet, and
a series of reflecting surfaces and a lens mechanically mounted to optically transmit an upright erect image of a scene drawn on the sheet, when illuminated, to the subsequent portion of the sheet at the drawing area.

7. An animation device for use in producing a sequence of scenes including:
a frame,
a plain drawing surface mounted on said frame,
an elongate sheet of material receptive to a drawn scene extending across the drawing surface, means to transport a portion of the sheet and a scene drawn thereon from the drawing surface to a second location, and
means to transmit an erect upright image of the drawn scene on the sheet from the second location to a subsequent portion of the sheet at the drawing surface.

8. The invention of claim 7 wherein the image transmission means includes:
illuminating means arranged to illuminate the drawn scene at the second location and,
a series of reflecting surfaces and a lens positioned to optically transmit an erect upright image of the drawn scene from the second location to the subsequent portion of the sheet at the drawing surface.

9. The invention of claim 8 wherein one of the lens and series of reflecting surfaces is adjustable to vary the size of the image transmitted.

References Cited

UNITED STATES PATENTS

| | | | |
|---|---|---|---|
| 1,198,598 | 9/1916 | Sudmann | 352—52 |
| 2,181,134 | 11/1939 | Katz. | |
| 2,351,634 | 6/1944 | Place | 352—51 |
| 2,824,490 | 2/1958 | Fitzgerald. | |

JULIA E. COINER, *Primary Examiner.*

U.S. Cl. X.R.

35—26; 352—81, 92; 353—44